Figures 1, 2:
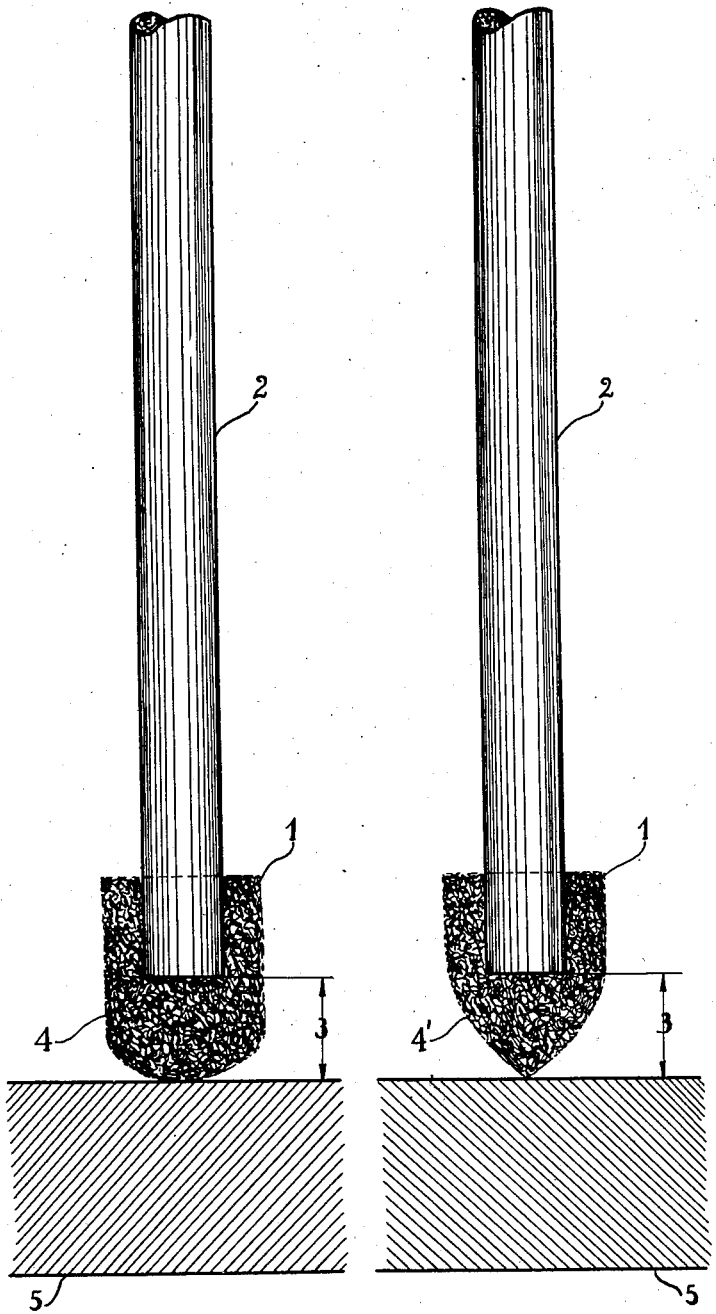

June 14, 1949.  R. J. SCHMERBER  2,472,923
METHOD FOR STRIKING THE WELDING ARC IN AUTOMATIC
ELECTRIC-ARC WELDING MACHINES
Filed Nov. 18, 1946  2 Sheets-Sheet 2

INVENTOR
RAOUL J. SCHMERBER
BY Young, Emery & Thompson
ATTYS-

Patented June 14, 1949

2,472,923

UNITED STATES PATENT OFFICE 2,472,923

METHOD FOR STRIKING THE WELDING ARC IN AUTOMATIC ELECTRIC-ARC WELDING MACHINES

Raoul Jean Schmerber, Uccle, Belgium, assignor to La Soudure Electrique Autogene, Societe Anonyme, Brussels, Belgium Application November 18, 1946, Serial No. 710,458
In Belgium November 22, 1945

7 Claims. (Cl. 315—60)

In automatic electric-arc welding machines, the automatic striking of the electric-arc is generally effected by an essentially mechanical action. For this purpose, a motor for regulating the feed of the welding electrode is set in motion, in order to direct the end of the electrode towards the work, until said electrode makes a short-circuit which is suddenly broken to strike the welding arc. This break which, in the well-known manner, produces the striking of the welding arc, could only be effected by reversing the direction of operation of the said electrode feed motor and the same is generally mounted, together with its reverse control mechanisms and the feed regulating members for the electrode, on a carriage which, in addition, carries another motor for controlling its translatory movement above the joint to be welded.

This arrangement, which is already heavy and in addition cumbersome, can be substantially lightened and considerably simplified by the method of the present invention, which eliminates the necessity of reversing the direction of rotation of the aforesaid motor and, consequently, the corresponding control mechanisms.

According to the invention, the striking of the arc in automatic electric-arc welding machines is effected by means of a fuse which is short-circuited between the metal end of the electrode and the part to be welded, and the melting and/or the reaction of combustion of which produces the initial ionisation of the space between the said metal end of the electrode and the part to be welded.

In this manner, the current being switched on the electrode, it is only necessary for the feed regulating motor, which has been set in motion in its sole and normal direction of rotation, to bring the end of the electrode into contact with the work through the intermediary of the said fuse, in order that the arc shall be struck forthwith.

Said fuse comprises a metal body and one or more substances capable of producing at high temperature a chemical reaction with the metal of the said body. When the short-circuit occurs, the metal of the fuse is heated by Joule effect and is instantly raised to a high temperature, producing a chemical reaction of combustion in which the atomic exchanges disturb the equilibrium of a few electrons, which then escape tangentially and ionise the air, whereas the products of the said combustion are volatilised. Since these phenomena occur in a small fraction of a second, the welding arc is instantly struck and the motor for the translatory movement of the carriage above the work may be started immediately. The motor for regulating the feed of the electrode, which is already operating owing to its having brought the end of the electrode into contact with the work with the interposition of the fuse, then performs its function of regulating the length of the arc, between the electrode which it feeds towards the work, in the course of the welding operation.

The metal of the fuse according to the invention may be iron or steel, or any other appropriate metal.

Amongst the chemical substances used for reacting with the metal of the fuse, potassium chromate has been found to be one of the most satisfactory. But it is possible to use other compounds and in particular other chromic acid compounds, which have advantages for obtaining a fuse which is a commercial article of good quality and which keeps well. For this purpose, it is possible to use, for example, a mixture of neutral potassium chromate and potassium dichromate, mixtures of neutral calcium chromate and potassium dichromate, mixtures of neutral barium chromate and neutral potassium chromate, mixtures of neutral barium chromate and potassium dichromate, and any other mixtures of chromic acid compounds of one or more alkali or alkaline earth metals.

Figure 6:
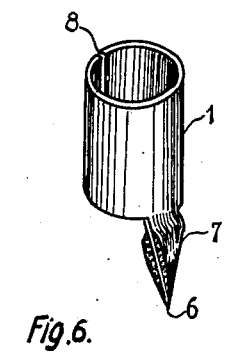

The fuse according to the invention may have various embodiments. Figs. 1 to 4 of the drawings accompanying the present specification show, in section and enlarged four diameters, fuses engaged on the end of an electrode of which the diameter is about four millimetres. Figs. 5 and 6 are perspective views of fuses according to the invention, which have been shown on the same scale. In all these figures, the same elements are designated by the same reference numerals.

As shown in Fig. 1, the fuse 1 which is shaped like a cylindrical cap engages the electrode 2 in a cylindrical cavity, the diameter of which corresponds to the gauge of the electrode. Said fuse is manufactured in a mould, from steel turnings or iron sponge, for example, to which are added the chemical substances already defined, which, being in the finely divided state, penetrate into the interstices or pores of the pressure moulded article. The head of the fuse is of a longitudinal thickness 3 which substantially corresponds to the length of the arc normally used and may terminate in a rounded portion 4 which bears against the work 5.

However, as shown in Fig. 2, the head of the fuse may be of a different appropriate cross-sectional shape.

In order to increase the ohmic resistance of the porous fuse, a head 4' of pointed shape is preferably provided, the increase of said ohmic resistance tending to increase the rapidity of the Joule effect which starts the reaction for striking the welding arc.

Figure 3:
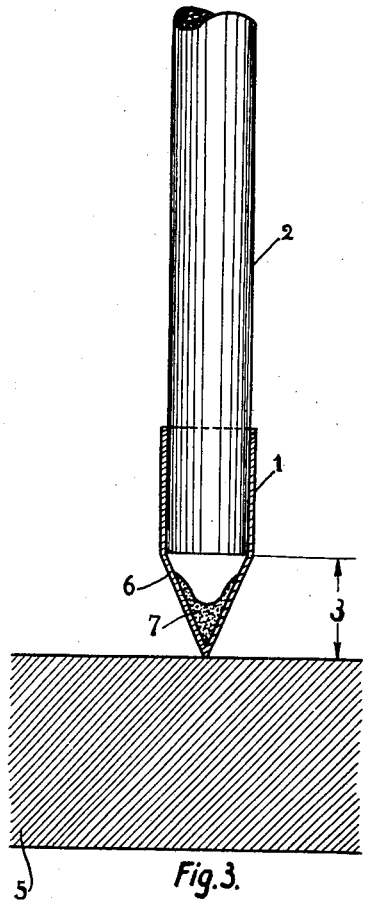

For the same purpose and also for obtaining a stronger fuse body, the fuse according to Fig. 3 is made of thin sheet stamped in the shape of a cap 1 which engages the end of the electrode 2 and terminates in a cone 6 inside which are arranged the chemical substances 7 which are intended to react with the metal of the cone 6 when said cone is heated to a high temperature, by Joule effect, at the instant when it touches the part to be welded 5. The finely divided chemical substances 7 can be pressed into the cone 6 with an appropriate binder, so as to line the inner walls of the cone 6, the height 3 of which corresponds to the length of arc normally used.

Figure 4:
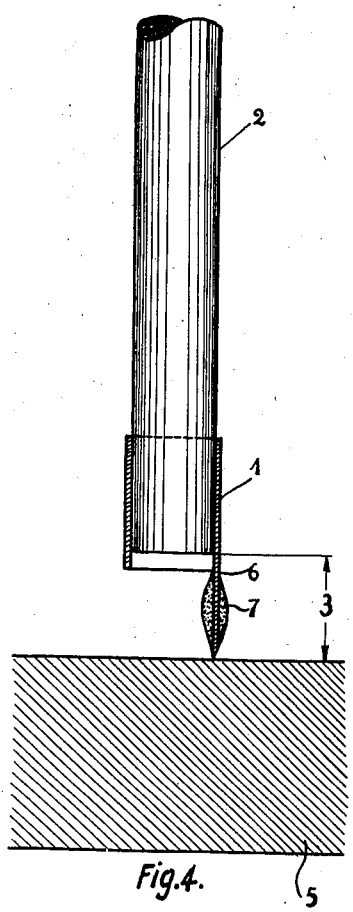
Figure 5:
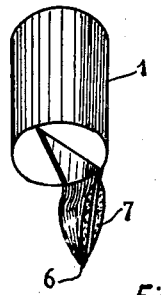

In the embodiment shown in Fig. 4, the fuse is shaped like a bayonet formed by a cylindrical cap 1 which engages the end of the electrode and in the bottom of which is cut out a point 6 which is bent outwards into alignment with the generatrix of the cylinder 1. This shape is better shown in perspective in Fig. 5. The point 6 is covered or coated on the outside with the chemical substances 7, by means of an appropriate binder.

Fig. 6 shows another example of construction of the fuse, according to which a bayonet is formed by a thin sheet of metal which is shaped into a cylinder 1 with a point 6 and which is slit at 8 in order to form a spring about the cylindrical part of the end of the electrode. In this case also, as in the previous case, the point 6 is covered or coated with the chemical substances 7, which are intended to react with the metal and to burn it when the said point is heated to a high temperature or melted, by Joule effect, at the instant when, in accordance with the required purpose, it touches the work 5 in the welding circuit.

The invention is more especially applicable for striking the arc on the welding electrode in an automatic machine, such as that described in the patent filed this day, in the same name, for "Automatic machine for electric arc welding" and using an alternating current welding circuit. It is however also applicable in automatic machines for electric-arc welding which use direct current and in which it makes it possible to eliminate just as well and in accordance with the required purpose, the reversal of the direction of rotation of the motor for feeding the electrode, and the corresponding control mechanisms and members.

What I claim is:

1. In a method for striking a welding arc in automatic electric arc welding machines using a metal electrode consisting in short-circuiting between the metal end of said electrode and the part to be welded, a fuse which is provided on said end, the use of a fuse comprising an iron body and at least a chromic acid compound forming, by a temperature elevation, with the iron of said body a compound having high heat formation and thereby producing an initial ionization of the space between the metal of said electrode and the part to be welded.

2. In a method for striking the welding arc in automatic electric arc welding machines using a metal electrode consisting in short-circuiting between the metal end of said electrode and the part to be welded, a fuse which is provided on said end, the use of a fuse comprising an iron body and an alkali metal chromate.

3. In a method for striking the welding arc in automatic electric arc welding machines using a metal electrode consisting in short-circuiting between the metal end of said electrode and the part to be welded, a fuse which is provided on said end, the use of a fuse comprising an iron body and an alkali metal bi-chromate.

4. In a method for striking the welding arc in automatic electric arc welding machines using a metal electrode consisting in short-circuiting between the metal end of said electrode and the part to be welded, a fuse which is provided on said end, the use of a fuse comprising an iron body and a mixture of an alkali metal chromate and of an alkali metal bi-chromate.

5. In a method for striking the welding arc in automatic electric arc welding machines using a metal electrode consisting in short-circuiting between the metal end of said electrode and the part to be welded, a fuse which is provided on said end, the use of a fuse comprising an iron body and a mixture of an alkaline earth metal chromate and of an alkali metal chromate.

6. In a method for striking the welding arc in automatic electric arc welding machines using a metal electrode consisting in short-circuiting between the metal end of said electrode and the part to be welded, a fuse which is provided on said end, the use of a fuse comprising an iron body and a mixture of an alkaline earth metal chromate and of an alkali metal bi-chromate.

7. In a method for striking a welding arc in automatic electric arc welding machines using a metal electrode consisting in short-circuiting between the metal end of said electrode and the part to be welded, a fuse which is provided on said end, the use of a fuse comprising an iron body and at least a chromic acid compound of a metal selected from the group consisting of alkali metals and alkaline earth metals forming, by a temperature elevation, with the iron of said body a compound having high heat formation and thereby producing an initial ionization of the space between the metal of said electrode and the part to be welded.

RAOUL JEAN SCHMERBER.

REFERENCES CITED

The following references are of record in the file of this patent:

UNITED STATES PATENTS

| Number | Name | Date |
| --- | --- | --- |
| 412,599 | Coffin | Oct. 8, 1889 |
| 2,043,960 | Jones et al. | June 9, 1936 |
| 2,134,705 | Crecca | Nov. 1, 1938 |
| 2,326,865 | Kennedy | Aug. 17, 1943 |
| 2,370,100 | White | Feb. 20, 1945 |
| 2,405,673 | Scherl | Aug. 13, 1946 |